United States Patent
White et al.

(10) Patent No.: US 7,990,109 B2
(45) Date of Patent: Aug. 2, 2011

(54) TEMPERATURE AND POLARIZATION VOLTAGE COMPENSATION SYSTEM

(75) Inventors: Daniel J. White, Baltimore, MD (US); Janet M. Embrey, Fallston, MD (US); Daniele C. Brotto, Baltimore, MD (US); Andrew E. Seman, Jr., White Marsh, MD (US)

(73) Assignee: Black & Decker Inc., Newark, DE (US)

( * ) Notice: Subject to any disclaimer, the term of this patent is extended or adjusted under 35 U.S.C. 154(b) by 218 days.

(21) Appl. No.: 12/157,987

(22) Filed: Jun. 13, 2008

(65) Prior Publication Data

US 2008/0309289 A1    Dec. 18, 2008

Related U.S. Application Data

(60) Provisional application No. 60/943,912, filed on Jun. 14, 2007.

(51) Int. Cl.
*H02J 7/00* (2006.01)
(52) U.S. Cl. ........................................... 320/136
(58) Field of Classification Search .................. 320/136
See application file for complete search history.

(56) References Cited

U.S. PATENT DOCUMENTS

| | | | |
|---|---|---|---|
| 5,332,958 A * | 7/1994 | Sloan | 320/136 |
| 7,508,171 B2 * | 3/2009 | Carrier et al. | 320/138 |
| 7,602,146 B2 * | 10/2009 | Carrier et al. | 320/120 |
| 7,612,525 B2 * | 11/2009 | Ito et al. | 320/106 |
| 2005/0077878 A1 * | 4/2005 | Carrier et al. | 320/134 |
| 2006/0285366 A1 * | 12/2006 | Radecker et al. | 363/16 |

OTHER PUBLICATIONS

U.S. Appl. No. 10/959,193, filed Oct. 7, 2004, David A. Carrier.
U.S. Appl. No. 11/239,286, filed Sep. 30, 2005, David A. Carrier.
U.S. Appl. No. 11/552,832, filed Oct. 25, 2006, David A. Carrier.
U.S. Appl. No. 12/079,424, filed Mar. 26, 2008, David A. Carrier.
U.S. Appl. No. 12/082,107, filed Apr. 9, 2008, David A. Carrier.
U.S. Appl. No. 12/150,458, filed Apr. 28, 2008, David A. Carrier.

* cited by examiner

*Primary Examiner* — Edward Tso
*Assistant Examiner* — Ramy Ramadan
(74) *Attorney, Agent, or Firm* — Harness, Dickey & Pierce, P.L.C.

(57) ABSTRACT

A control module for a battery that powers a load includes a compensation module that adjusts a shutoff voltage based on voltage and impedance of the battery and current drawn by the load from the battery as time the load is drawing current increases. A discharge control module restricts power to the load based on the adjusted shutoff voltage.

42 Claims, 5 Drawing Sheets

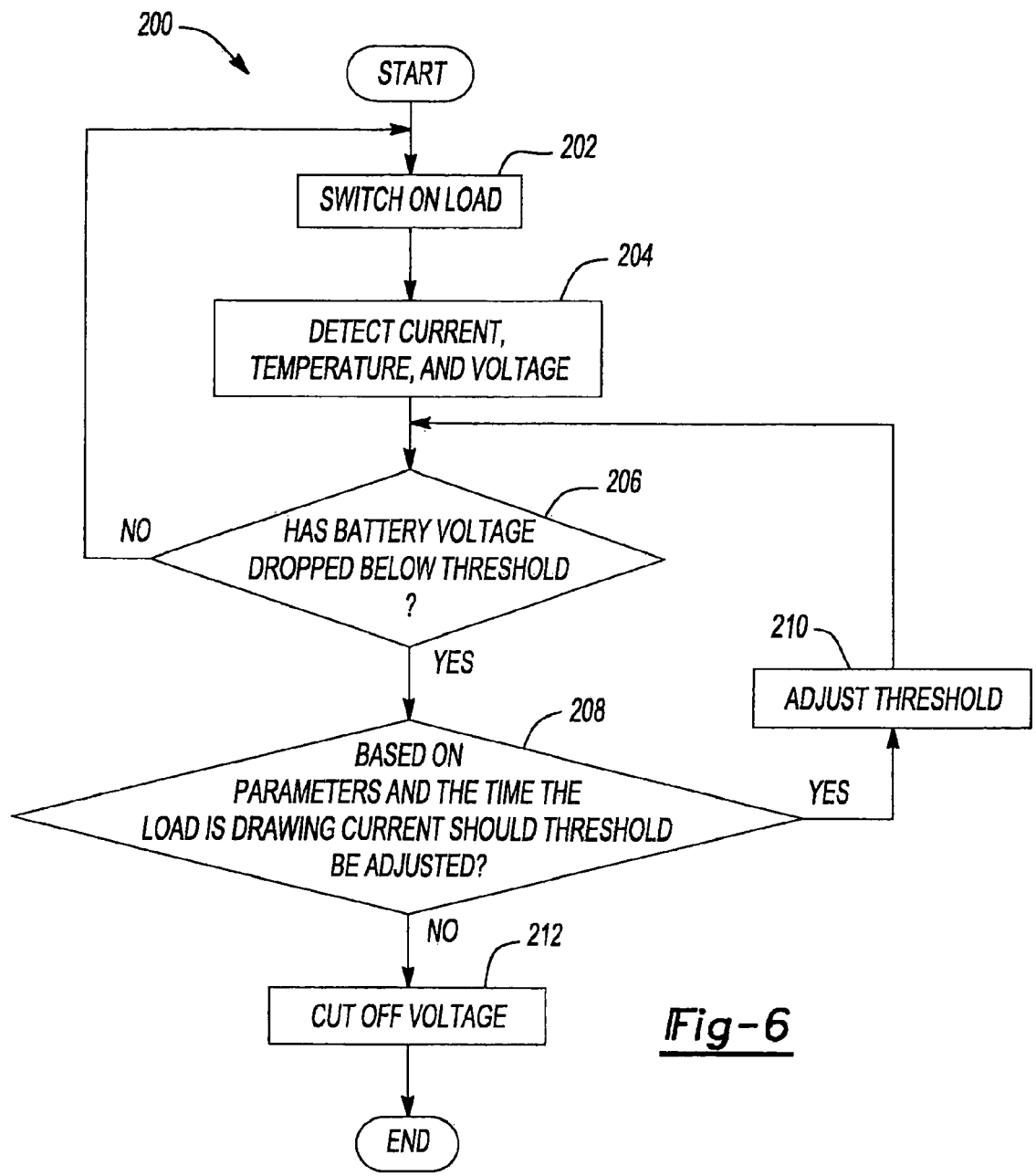

TEMPERATURE AND POLARIZATION VOLTAGE COMPENSATION SYSTEM

CROSS-REFERENCE TO RELATED APPLICATIONS

This application claims the benefit of U.S. Provisional Application No. 60/943,912 filed on Jun. 14, 2007. The disclosure of the above application is incorporated herein by reference.

FIELD

The present disclosure relates to power tools and more particularly to battery packs for power tools.

BACKGROUND

Rechargeable batteries may be used to power numerous devices, from computer products to housewares to power tools. The batteries often include nickel-cadmium, nickel-metal-hydride and/or lithium-ion cells connected in series. Battery packs may power cordless devices and may be removed and charged in a battery charger or charged in the cordless device itself.

The maximum number of battery cells connected in series in one battery pack is determined by the relationship between the output voltage of the battery pack and a power source voltage supplied at the time of charging. For instance, the typical output voltage of one NiCd battery cell or one NiMH battery cell is 1.2V, and the power source voltage supplied at the time of charging is approximately 1.7V. Assuming that an 18V output voltage from a battery pack is suitable for most general purpose electronic devices, the maximum number of NiCd or NiMH battery cells connected in series in the battery pack may be 15. On the other hand, the typical output voltage of one Li-ion battery cell may be approximately 3.6V. Accordingly, the maximum number of Li-ion battery cells connected in series in an exemplary 18V Li-ion battery pack may be 5.

Unlike a NiCd battery pack and a NiMH battery pack, the Li-ion battery pack may include functionality to protect against fault conditions inside and outside the battery pack. This prevents cells in the Li-ion battery pack from deteriorating and shortening useful life of the pack. For instance, if a fault condition such as short-circuiting occurs inside or outside the Li-ion battery pack, a fuse and/or switch may be provided to cut off an over-discharging current or an over-charging current, if the discharging current or charging current becomes larger than a given current level.

The above-described battery pack with charge/discharge control and over-discharge protection is designed primarily for low-voltage portable electronic devices such as notebook-type personal computers, cellular phones, etc., which require voltage generally on the order of 2 to 4 volts. Such devices are characterized by using battery packs composed of cells (such as Li-ion, NiCd, NiMH cells) that provide a maximum output voltage of about 4.2 volts per cell.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A control module for a battery that powers a load includes a compensation module that adjusts a shutoff voltage based on voltage and impedance of the battery and current drawn by the load from the battery as time the load is drawing current increases. A discharge control module restricts power to the load based on the adjusted shutoff voltage.

In other features, a cordless power tool system includes a first power tool and a battery pack. The battery pack provides power to the power tool and comprises a plurality of battery cells and a compensation module. The compensation module adjusts a shutoff voltage that restricts the power based on voltage and impedance of the plurality of battery cells and current drawn by the first power tool from the plurality of battery cells as a function of time.

In other features, the compensation module increasingly adjusts the shutoff voltage as time increases. The compensation module adds a first voltage amount to the shutoff voltage for a first increment of time to generate a first adjusted shutoff voltage. The compensation module adds a second voltage amount to the adjusted shutoff voltage for a second increment of time to generate a second adjusted shutoff voltage. The function of time comprises at least one of a logarithmic function, an exponential function, and a look-up table.

In other features, a temperature sensor senses a temperature of at least one of the plurality of battery cells. The compensation module adjusts the shutoff voltage based on the temperature. The compensation module includes a predetermined base amount of adjustment for the shutoff voltage that is independent of a type of the first power tool. The control module controls a switch to restrict the power to the first power tool.

In other features, at least one of the plurality of battery cells comprises at least one of lithium metal, lithium polymer, nickel cadmium (NiCd), nickel metal hydride (NiMH), and lead-acid. The battery pack is removably coupled to the first power tool. A charger recharges the plurality of battery cells. The battery pack may also communicate a second power tools, and the second power tool draws a different current from the battery pack than the first power tool.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 is a block diagram that illustrates a method according the present disclosure.

DETAILED DESCRIPTION

Figure 1:
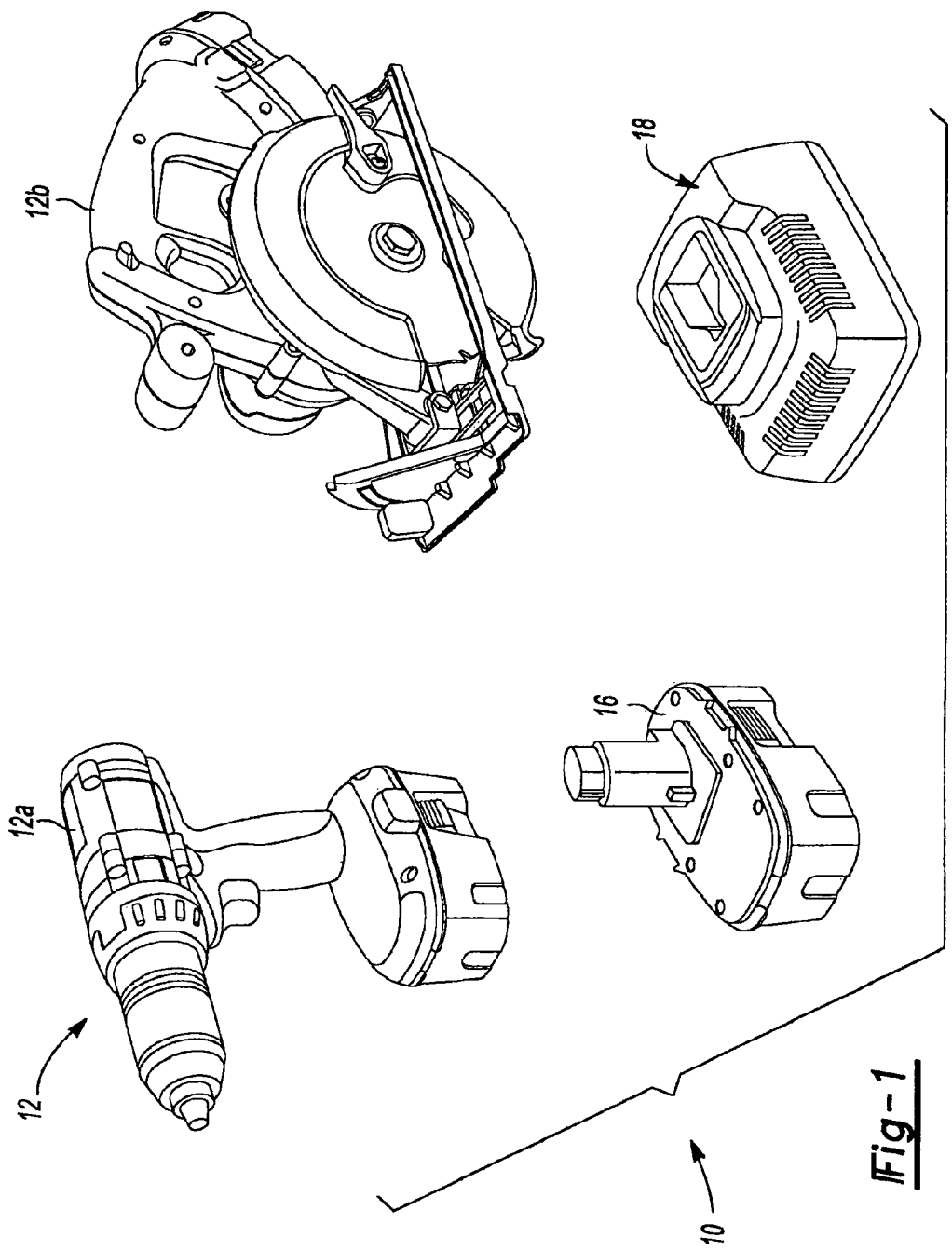
FIG. 1 is a system of power tools according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, the present disclosure can relate to a system of power tools of the type that is generally indicated by reference numeral 10. The system of power tools 10 can include, for example, one or more power tools 12, a battery pack/system 16 and a battery pack charger 18. Each of the power tools 12 can be any type of power tool, including without limitation drills, drill/drivers, hammer drill/drivers, rotary hammers, screwdrivers, impact drivers, circular saws, jig saws, reciprocating saws, band saws, cutoff tools, cut-out tools, shears, sanders, radios, vacuums, lights, routers, adhesive dispensers, concrete vibrators, lasers, staplers and nailers.

In the particular example provided, the system of power tools 10 includes a first power tool 12a and a second power tool 12b. For example, the first power tool 12a can be a drill/driver similar to that which is described in U.S. Pat. No. 6,431,289, while the second power tool 12b can be a circular saw similar to that which is described in U.S. Pat. No. 6,996,909. The battery pack 16 can be selectively removably coupled to the first and second power tools 12a and 12b to provide electrical power thereto. Except as otherwise described herein, the battery pack 16 can be configured in a manner that is similar to that which is described in U.S. Patent Application Publication No. 2006/0096771. The battery pack 16 can also be selectively electrically coupled to the battery pack charger 18 to charge the battery pack 16.

Figure 2:
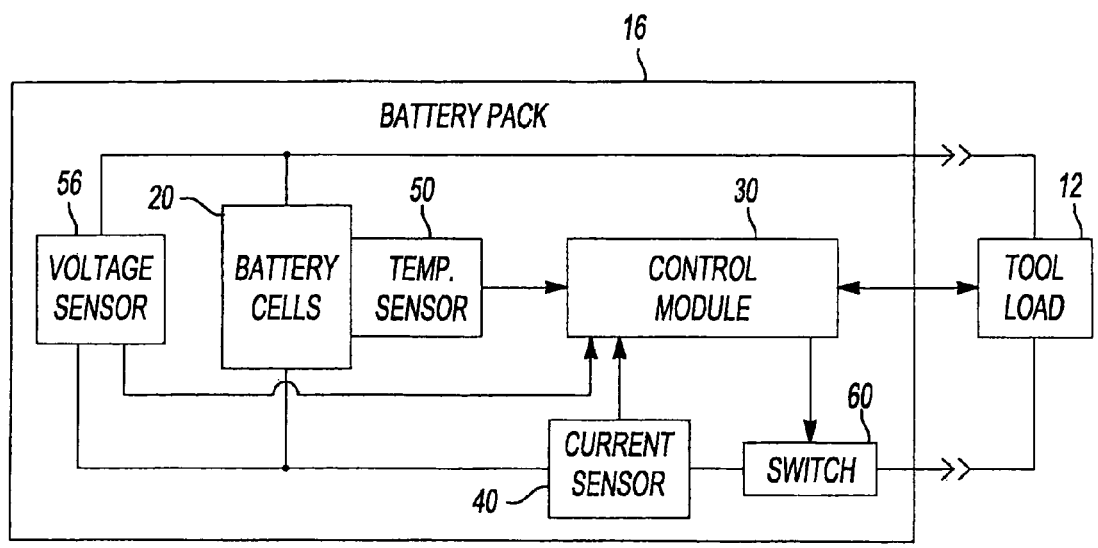
FIG. 2 is a schematic diagram of a battery pack communicating with a load according to the present disclosure.

Referring now to FIG. 2, a battery pack 16 may include a plurality of battery cells 20 connected in series. As the exemplary embodiments are directed to the cordless power tool environment, the nominal voltage rating of the battery pack 16 may be at least 18V. The pack 16 may be understood as a removable power source for high-power power tool operations.

The battery pack 16 may include lithium-ion (Li-ion) cells or cells of another lithium-based chemistry, such as lithium metal or lithium polymer, or other chemistry such as nickel cadmium (NiCd), nickel metal hydride (NiMH) and lead-acid. The battery pack 16 communicates with the tool 12 through various terminals. The battery pack 16 includes a control module 30 that may receive signals from a current sensor 40, a temperature sensor 50, and a voltage sensor 56, and that may control a switch 60. The switch 60 may also be embodied as a fuse.

Various battery technologies can be damaged when discharged in excess of the manufacturer's recommendations. Excessive discharge can also lead to insufficient shelf life when stored in a discharged state. In accordance with the exemplary embodiments, the battery pack 16 may include the control module 30 to prevent current flow when the battery voltage drops below a given voltage threshold, hence under-voltage lockout. The control module 30 can determine if the battery voltage drops below a predetermined voltage level/threshold and can turn off the switch 60. With the switch turned off, battery cells 20 may still be susceptible to charge, but may not discharge any more. The threshold may be an absolute threshold set at time of manufacture, for example, or a threshold that may vary based on a number of other factors.

The temperature sensor 50 measures temperature of the cells 20. The temperature sensor 50 may be embodied as negative temperature coefficient (NTC) or positive temperature coefficient (PTC) thermistors, temperature sensing integrated circuits, or thermocouples. The control module 30 and/or intelligence in a connected charger 18 may receive temperature sensor signals. The current sensor 40 may be embodied as known components for current sensors, such as a shunt resistor, current transformer, etc., which may provide a signal representing sensed current in the battery pack 16. The voltage sensor 56 may be configured to sense individual cell voltage and/or sense total pack voltage of the cells 20 and may provide a signal representing the individual cell or stack voltage. The switch 60 may clamp or discontinue discharge current and charge current.

Figure 3:
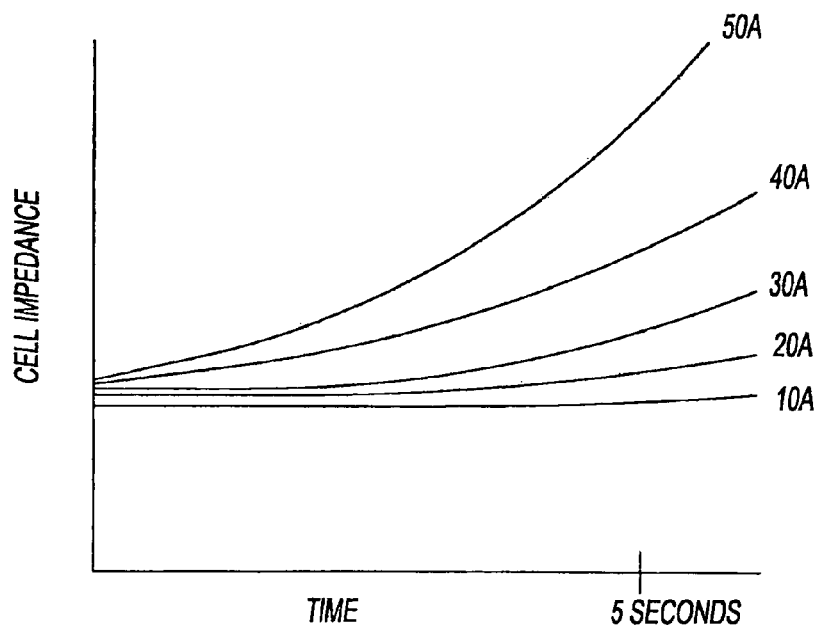
FIG. 3 is a graph of cell impedance within the battery pack over time for different load currents.

Referring now to FIG. 3, the battery cells 20 have an internal impedance. The voltage of the cells 20 may therefore drop by a predictable amount as a low current load is applied over time. In other words, if the load draws 10 A from a cell having a 3V core voltage/chemical voltage and 10 mΩ internal impedance, the cell voltage may drop to, for example, 2.9V.

When the load 12 draws higher currents, such as 50 A, the internal impedance of the cells 20 may change dynamically over time due to polarization voltage. For example, if a load is drawing 50 A initially, the cell core voltage may appear to be about 10 mV. 2.5V may be detected external to the cells 20 as the load 12 is applied if the core voltage were 3V. As time progresses, the detected output voltage sharply decreases.

Equilibrium voltage may be referred to as the open-circuit battery cell voltage that is detected by a voltage sensor. Polarization voltage may describe the combined effects of concentration and ion/charge-transfer. In other words, polarization voltage may include voltage deviation from the equilibrium voltage caused by charge or discharge. In practice, polarization voltage may be described as a minimum amount/yield of input energy that is required to polarize/charge the surface layer of a battery cell to initiate the process of material conversion. The process of material conversion produces electrical energy.

Figure 4:
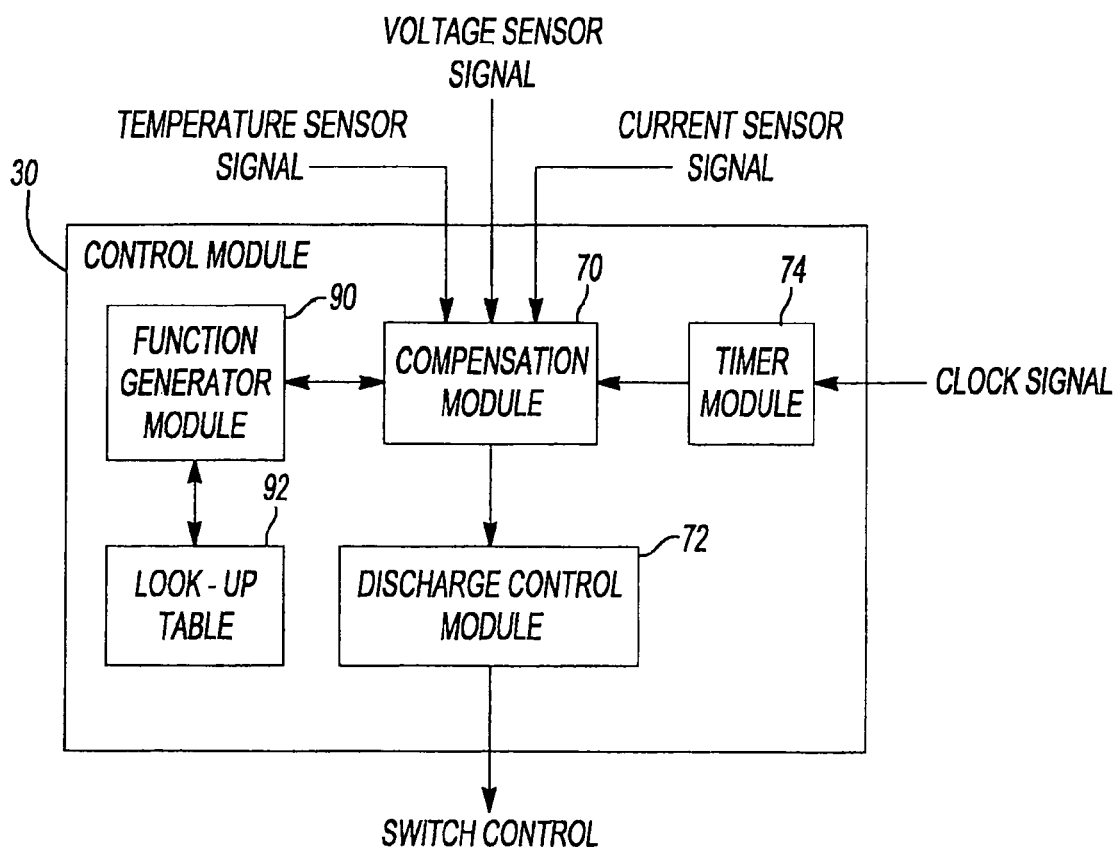
FIG. 4 is a schematic diagram of a battery pack control module according to the present disclosure.

Referring now to FIG. 4, the control module 30 includes a compensation module 70 that compensates for the output voltage decrease caused by, among other things, polarization voltage by adjusting the cutoff voltage of the cells 20. A discharge control module 72 controls the switch 60 based on the cutoff voltage, as the cutoff voltage may be the battery voltage at which the discharge is terminated. Discharge of the cells 20 generally includes conversion of chemical energy in a cell or battery to electrical energy. The base cutoff voltage may be specified by the battery manufacturer and is generally a function of discharge rate. The switch 60 may cut off power to the load 12 based on a low cell voltage of, for example, approximately 2.5V. However, the voltage sensor 56 may read the cutoff voltage from the cells 20 while there is still sufficient energy left in the cells 20 for powering the tool 12 when high current, for example 50 A, is drawn by the tool 12 for a period of time, for example, 5 seconds.

The control module 30 compensates the voltage based on a voltage drop due to cell impedance by adding in a compensation factor K, where the compensated voltage is determined by $V_{actual}=V_{measured}+K$. The compensation module 70 may add the compensation voltage to the measured voltage. For example, if the 2.9V are measured at the output; and the control module 30 is aware of a low current load, for example a 10 amp load, the compensation module 70 adds a voltage (K), for example 100 mV, back onto the measured cell voltage. The compensation module adds this voltage because it is aware that the core voltage is actually at 3V. If a 2.5V cell (i.e. low cell) is detected, the compensation module 70 may determine that the cell does not need to be shut off because the cell really has a core voltage of, for example, 2.6V. The compensation module 70 may appropriately adjust the cutoff voltage based on this determination.

In accordance with the principles described above, an exemplary compensation factor, K, may be computed as follows:

$$K(T,I)=I*g(T),$$

where I is current load, T is temperature, and g(T) is a temperature compensation lookup table. The temperature compensation lookup table may be empirically derived. For illustration purposes, a few values from an exemplary temperature compensation lookup table are as follows:

|     | 0° C. | 10° C. | 20° C. |
|-----|-------|--------|--------|
| 10A | 0.3   | 0.2    | 0.1    |
| 20A | 0.6   | 0.4    | 0.2    |
| 30A | 0.9   | 0.6    | 0.3    |
| 40A | 1.2   | 0.8    | 0.4    |
| 50A | 1.5   | 1.0    | 0.5    |

This exemplary table is based on a cell with an impedance of less than 0.010 ohms at 20 C that has a negative temperature coefficient of 1 milliohm per 1 C. Rather than a lookup table, it is readily understood that temperature compensation may be implemented using a function. Likewise, it is contemplated that the compensation factor may be derived from other types of parameters or combinations thereof.

Thus, the compensation module 70 may add back in a higher amount of compensation voltage onto that measured voltage at higher currents 50 A. In this way, the control module 30 or other tool/battery pack system does not shut off power from the battery too early based on the additional compensation voltage. Previously, a control module 30 may set cutoff voltages much lower than what the control module 30 would expect to encounter or set all limits lower than the low battery voltage level in order to prevent unwanted shut-offs. However these lower limits may lead to the cells being over-discharged unnecessarily.

The compensation module 70 may also adjust the compensation voltage based on an amount of time a particular current is drawn from the cells. In an exemplary embodiment, the compensation factor, K, may be computed similar to the manner described above. To account time, the determination for the compensation factor is modified as follows:

$$K(T,I)=I*h(t)*g(T),$$

Where h(t)=1+t*k, t is the time under load and k is a time compensation constant such as k=0.002. In this example, the time compensation would be 2 milliohms impedance per second. Alternatively, the compensation module 70 may progressively compensate voltages based on a compensation factor derived using an integral function generated in a function generation module 90, such as $\int KT\, dt$ or $\int K_1 + K_2|^2\, dt$. A timer module 74 of the control module 30 measures the amount of time a particular current is drawn and the compensation module 70 in turn adjusts the amount of compensation as a function of time. Various other techniques, including look-up tables, may be used to compensate voltage as a function of current and time.

Moreover, how compensation is applied may also be dynamically adjusted over longer periods of time. For instance, when a battery pack is first put in use, the compensation module 70 applies 500 mV of compensation for a load of 50 A. Thus, a measured cell voltage of 2.5V is raised to 3V. But over time, the variance between the measured cell voltage and actual cell voltage may increase. Therefore, the compensation module 70 may progressively add more compensation. For example, the control module may maintain a counter for how many times the pack is charged. Each time the pack is charged the counter is incremented. After a predefined number of the charges, the compensation module 70 may modify the compensation process. In another example, the battery charger may determine the actual cell voltage based upon the amount of charge supplied to a given cell. The charger may then compare this determined cell voltage to a cell voltage measured internal to the pack by a voltage detection circuit and reported by the pack to the charger. When the variance exceeds a threshold, the charger instructs the battery pack to update the compensation process. In an exemplary embodiment, the temperature compensation table is updated within the battery pack. The table may be replaced with a new table or updated by an algorithm executed by the compensation module. Alternatively, a constant in a compensation function may be updated with a new constant value. In either case, the adjustment results in a larger compensation value for the measured cell voltage. In this way, dynamic adjustment may be made to the compensation process thereby taking into account unknown variables such as aging.

Figure 5:
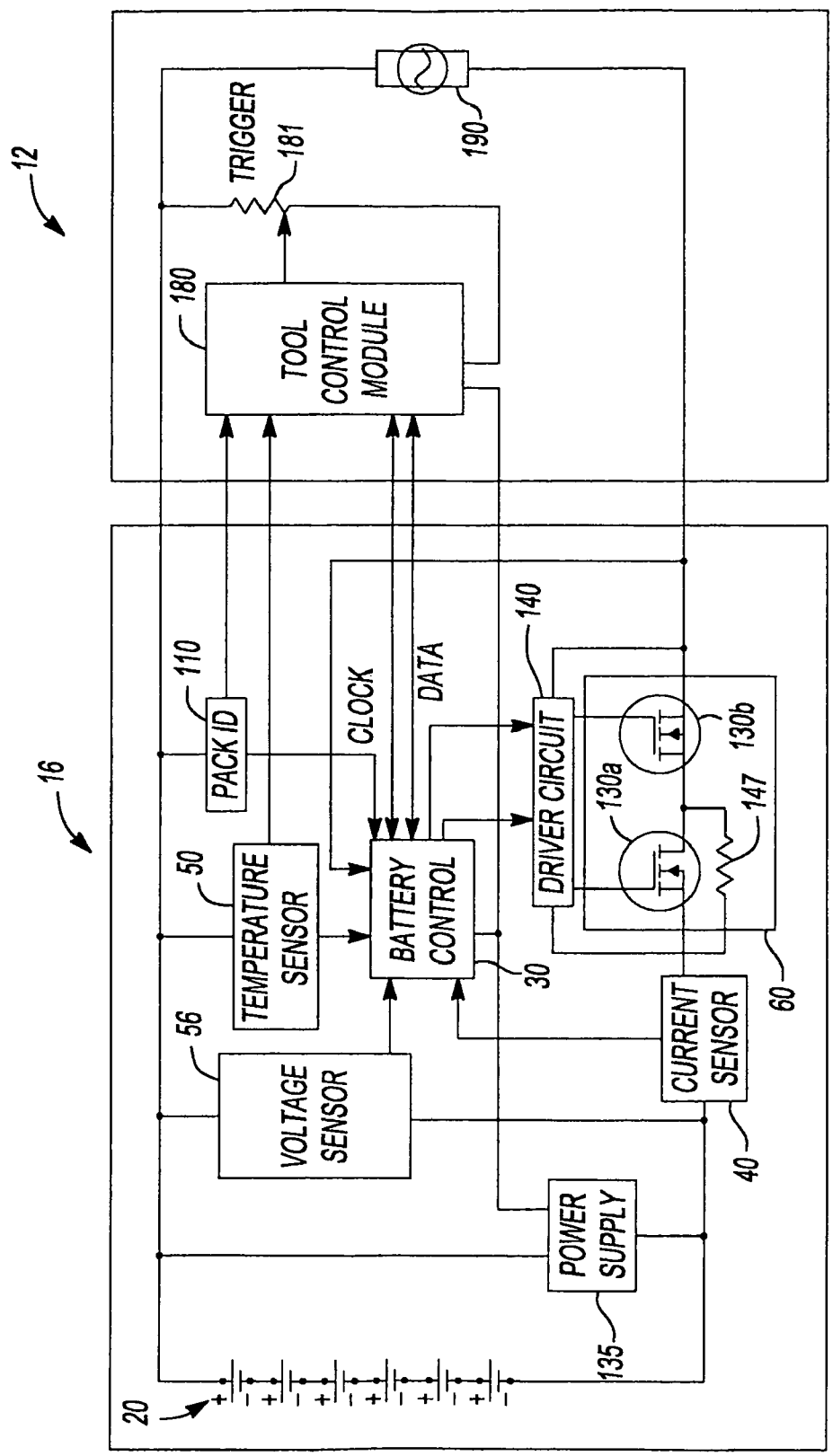
FIG. 5 is a schematic diagram of a battery pack communicating with a load according to the present disclosure.

FIG. 5 is a schematic diagram illustrating components and connections between an exemplary battery pack 16 and an exemplary power tool 12 in accordance with an exemplary embodiment of the present disclosure.

When the tool trigger switch 181 is actuated, the cell voltage of the pack 16 may be applied to the tool control module 180. After an initialization period, the control module 30 determines the pack 16 is in a tool (instead of a charger) and checks the cell voltages. If all measurements are acceptable, the switch 60 is turned on to permit current to tool motor 190. For example, measurements may be acceptable if all cell voltages are above a given voltage level or voltage threshold, such as a given cutoff voltage below which the cell is in an under-voltage condition. Once the impedance of the pack is known, then the portion of the low-voltage threshold related to current can be calculated based on this knowledge. Additional battery factors that may influence and/or may be used to calculate the low voltage threshold may include battery temperature, battery age, rate of decrease in battery voltage, etc.

The pack 16 may also include a pack ID module 110 identifies the pack 16 when inserted into a charger 18 or tool 12. The pack ID module 110 may store information, such as the model number, version, cell configuration and the battery type (chemistry), such as lithium-ion, NiCd or NiMH. The control module 30 may base threshold adjustments on the type of cells in the pack. The switch 60 may clamp or discontinue discharge current and charge current and may include semiconductor devices 130a (discharge FET) and 130b (charge FET), under the control module 30. The control module 30 may be powered by an internal power supply 135 as shown, and the semiconductor devices 130a and 130b may be linked through a driver circuit 140. Semiconductor devices 130a may include a pull down resistor 147 which acts to bypass the semiconductor device 130a when device 130a is off and the pack 16 is dormant.

As during charging, the control module 30 monitors cell voltages during discharge of the cells 20. If the trigger switch 181 is released, the voltage supplied to the control modules 30, 180 and go to a reference voltage potential, such as ground. When the trigger switch 181 is pulled again, the control module 180 is powered up and the tool motor 190 operation continues. The tool motor 190 may be enabled as long as the trigger switch 181 is pulled and the cell voltages are greater than a given voltage level or voltage threshold. Once a cell of the plurality of cells 20 reaches a low voltage threshold, such as a cutoff voltage, for example, the control module 30 can command the switch 60 to turn off. This action may save the cells 20 from being over-discharged and may prolong cell life.

If the trigger switch 181 is left on (as some users may tape the trigger on), the control module 30 may continue to direct commands to control module 180 so as to continuously monitor cell voltages, but may maintain the switch 60 in the off state. Once the total voltage of the cells 20 has dropped below an exemplary threshold, in this example, this may be 25 volts, the control module 30 may tell the control module 180 to go into sleep mode. This action may substantially reduce power consumption inside the battery pack 16. The control module 180 may stay in this mode until the control module 30 is reset. The battery pack 16 may be eventually removed from the tool 12 in a discharged state. Over-charge protection, over-discharge protection and the ability to perform adaptive cell-balancing within a battery pack during a charge may all be accomplished in a battery pack.

Referring now to FIG. 6, a block diagram 200 illustrates a method for operating a battery pack according the present disclosure. In step 202 a load is switched on. In step 204, battery cell voltage, temperature and load current are determined. In step 206, if battery voltage has dropped below a predetermined threshold, a determination is made in step 208 whether the threshold should be adjusted. In step 210, the threshold may be adjusted as necessary based on battery cell voltage, temperature and load current and the time the load has been drawing current. If the control module determines that the threshold should not be adjusted, voltage is shut off to the load in step 212. It is to be understood that only the relevant steps of the methodology are discussed in relation to FIG. 6, but that other software-implemented instructions may be needed to control and manage the overall operation of the pack control system.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control module for a battery that powers a load comprising:
    a compensation module that determines an amount of time the current is drawn from the battery and variably adjusts a shutoff voltage as a function of a voltage measure of the battery, a measure of current being drawn from the battery and the amount of time the current has been drawn from the battery and
    a discharge control module that restricts power to the load based on said adjusted shutoff voltage.

2. The control module of claim 1 further comprising a timer module that generates signals that indicate said time the load is drawing said current, wherein said compensation module adjusts said cutoff voltage as a function of said timer module signals.

3. The control module of claim 2 wherein said compensation module adds a first voltage amount to said shutoff voltage for a first increment of time to generate a first adjusted shutoff voltage, wherein said compensation module adds a second voltage amount to said adjusted shutoff voltage for a second increment of time to generate a second adjusted shutoff voltage.

4. The control module of claim 2 wherein said a function of said timer module signals comprises at least one of a logarithmic function, an exponential function, and a look-up table.

5. The control module of claim 2 further comprising a function generation module that generates at least one of a logarithmic and an exponential functions based on the type of load drawing current.

6. The control module of claim 1 wherein said compensation module also adjusts said shutoff voltage based on a temperature of the battery.

7. The control module of claim 1 wherein said compensation module includes a predetermined base amount of adjustment for said shutoff voltage that is independent of the type of the load.

8. A battery pack comprising the control module and the battery of claim 1.

9. The battery pack of claim 8 further comprising a switch that is controlled by said discharge control module to restrict power to the load.

10. The battery pack of claim 8 wherein the battery comprises a plurality of cells.

11. The battery pack of claim 10 wherein at least one of said cells has a lithium-ion cell chemistry.

12. The battery pack of claim 10 further comprising a temperature sensor that senses a temperature of at least one of said cells, wherein said compensation module also adjusts said shutoff voltage based on said temperature.

13. The battery pack of claim 1 further comprising:
    a current sensor that senses said current; and
    a voltage sensor that senses said voltage.

14. A cordless power tool system comprising:
    a first power tool; and
    a battery pack that provides power to said power tool and that comprises a plurality of battery cells and a compensation module that determines an amount of time the current is drawn from the battery cells and adjusts a shutoff voltage as function of a voltage measure of the battery cells, a measure of current being drawn from the battery and the amount of time the current has been drawn from the battery cells and a discharge module that terminates current drawn from the battery cells when the voltage measure is below the shutoff voltage.

15. The cordless power tool system of claim 14 wherein said compensation module variably adjusts said shutoff voltage as time increases.

16. The cordless power tool system of claim 15 wherein said compensation module adds a first voltage amount to said shutoff voltage for a first increment of time to generate a first adjusted shutoff voltage, wherein said compensation module adds a second voltage amount to said adjusted shutoff voltage for a second increment of time to generate a second adjusted shutoff voltage.

17. The cordless power tool system of claim 14 wherein said function of time comprises at least one of a logarithmic function, an exponential function, and a look-up table.

18. The cordless power tool system of claim 14 further comprising a temperature sensor that senses a temperature of at least one of said plurality of battery cells, wherein said compensation module adjusts said shutoff voltage based on said temperature.

19. The cordless power tool system of claim 14 wherein said compensation module includes a predetermined base amount of adjustment for said shutoff voltage that is independent of a type of said first power tool.

20. The cordless power tool system of claim 14 further comprising a switch and a control module, wherein said control module controls said switch to restrict said power to said first power tool.

21. The cordless power tool system of claim 14 wherein at least one of said plurality of battery cells comprises at least one of lithium metal, lithium polymer, nickel cadmium (NiCd), nickel metal hydride (NiMH), and lead-acid.

22. The cordless power tool system of claim 14 wherein said battery pack is removably coupled to said first power tool.

23. The cordless power tool system of claim 14 further comprising a charger for said battery pack, wherein said charger recharges said plurality of battery cells.

24. The cordless power tool system of claim 14 further comprising a second power tool, wherein said battery pack communicates with one of said first and second power tools, and wherein said second power tool draws a different current from said battery pack than said first power tool.

25. A method for operating a battery pack having battery cells that is adapted to power a load comprising:
sensing a voltage of the cells;
sensing a temperature of the cells;
sensing current drawn from the cells by the load;
determining an amount of time the current is drawn from the cells; and
adjusting a predetermined low voltage threshold of the battery pack when voltage of the cells has dropped below said predetermined voltage threshold, wherein the predetermined voltage threshold is adjusted as a function of the temperature of the cells, the current drawn from the cells and the amount of time the current is drawn from the cells.

26. The method of claim 25 further comprising shutting off voltage from the cells to the load when said voltage of the cells drops below said adjusted predetermined threshold.

27. The method of claim 25 further comprising defining said function as follows:

$$K(T,I)=I*h(t)*g(T),$$

where I is the current drawn from the cells, T is the temperature, $h(t)=1+t*k$, t is the amount of time the current is drawn and k is a time compensation constant.

28. The method of claim 25 wherein said function of time comprises at least one of a logarithmic function, an exponential function, and a look-up table.

29. The method of claim 25 wherein at least one of the cells comprises at least one of lithium metal, lithium polymer, nickel cadmium (NiCd), nickel metal hydride (NiMH), and lead-acid.

30. A cordless power tool system comprising:
a first power tool; and
battery means for providing power to said power tool and that comprises a plurality of battery cell means for providing charge and compensation means for determining an amount of time the current is drawn from the battery means and adjusting a shutoff voltage as function of a voltage measure of the battery cells means, a measure of current being drawn from the battery means and the amount of time the current has been drawn from the battery means and a discharge means for terminating current drawn from the battery means when the voltage measure is below the shutoff voltage.

31. The cordless power tool system of claim 30 wherein said compensation means increasingly adjusts said shutoff voltage as time increases.

32. The cordless power tool system of claim 31 wherein said compensation means adds a first voltage amount to said shutoff voltage for a first increment of time to generate a first adjusted shutoff voltage, wherein said compensation means adds a second voltage amount to said adjusted shutoff voltage for a second increment of time to generate a second adjusted shutoff voltage.

33. The cordless power tool system of claim 30 wherein said function of time comprises at least one of a logarithmic function, an exponential function, and a look-up table.

34. The cordless power tool system of claim 30 further comprising temperature sensor means for sensing a temperature of at least one of said plurality of battery cell means, wherein said compensation means adjusts said shutoff voltage based on said temperature.

35. The cordless power tool system of claim 30 wherein said compensation means includes a predetermined base amount of adjustment for said shutoff voltage that is independent of a type of said first power tool.

36. The cordless power tool system of claim 30 further comprising means for switching and control means for controlling said means for switching to restrict said power to said first power tool.

37. The cordless power tool system of claim 30 wherein at least one of said plurality of battery cell means comprises at least one of lithium metal, lithium polymer, nickel cadmium (NiCd), nickel metal hydride (NiMH), and lead-acid.

38. The cordless power tool system of claim 30 wherein said battery means is removably coupled to said first power tool.

39. The cordless power tool system of claim 30 further comprising a charger means for charging said battery means.

40. The cordless power tool system of claim 30 further comprising a second power tool, wherein said battery means communicates with one of said first and second power tools, and wherein said second power tool draws a different current from said battery means than said first power tool.

41. A control scheme for a battery pack having one or more battery cells, comprising:
a voltage sensor operable to determine a voltage measure across the battery cells;
a compensation module adapted to receive the voltage measure from the voltage sensor and operable to determine an amount of time the current is drawn from the battery cells and determine a compensated voltage measure as a function of the voltage measure, current being drawn from the battery cells and the amount of time the current has been drawn from the battery cells; and
a discharge module adapted to receive the compensated voltage measure from the compensation module and operable to terminate current drawn from the battery cells based on the compensated voltage measure.

42. A control scheme for a battery pack having one or more battery cells, comprising:
a voltage sensor in the battery pack and operable to determine a measure of voltage across the battery cells;
a current sensor in the battery pack and operable to determine a measure of current being drawn from the battery cells;
a compensation module implemented as software instructions in a controller in the battery pack, the compensation module adapted to receive the current measure and operable to determines an amount of time the current is drawn from the battery cells and determine a compensation factor as a function of the current measure and the amount of time the current is drawn from the battery cells, the compensation module further adapted to receive the voltage measure and operable to compute a compensated voltage measure from the voltage measure and the compensation factor; and a discharge module implemented as software instructions in the controller, the discharge module adapted to receive the compensated voltage measure and operable to terminate current drawn from the battery cells when the compensated voltage measure is below a cutoff voltage threshold.

* * * * *